US008145655B2

(12) United States Patent
Bireley et al.

(10) Patent No.: US 8,145,655 B2
(45) Date of Patent: Mar. 27, 2012

(54) GENERATING INFORMATION ON DATABASE QUERIES IN SOURCE CODE INTO OBJECT CODE COMPILED FROM THE SOURCE CODE

(75) Inventors: William Robert Bireley, Morgan Hill, CA (US); Delmar Eugene Blevins, Los Gatos, CA (US); Stephen Andrew Brodsky, Los Gatos, CA (US); Jaijeet Chakravorty, Union City, CA (US); Anshul Dawra, San Jose, CA (US); Suavi Ali Demir, San Jose, CA (US); Swaminathan Gounder, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 11/767,451

(22) Filed: Jun. 22, 2007

(65) Prior Publication Data

US 2008/0319959 A1     Dec. 25, 2008

(51) Int. Cl.
*G06F 7/00* (2006.01)
*G06F 17/30* (2006.01)
(52) U.S. Cl. .................. 707/758; 707/759
(58) Field of Classification Search .................. None
See application file for complete search history.

(56) References Cited

U.S. PATENT DOCUMENTS

| | | | | |
|---|---|---|---|---|
| 5,452,449 | A * | 9/1995 | Baldwin et al. | 707/102 |
| 5,668,928 | A * | 9/1997 | Groner | 704/243 |
| 5,671,416 | A * | 9/1997 | Elson | 717/106 |
| 6,063,133 | A * | 5/2000 | Li et al. | 717/136 |
| 6,275,825 | B1 | 8/2001 | Kobayashi et al. | |
| 6,378,126 | B2 * | 4/2002 | Tang | 717/143 |
| 6,457,172 | B1 * | 9/2002 | Carmichael et al. | 717/141 |
| 6,496,833 | B1 * | 12/2002 | Goldberg et al. | 1/1 |
| 6,681,232 | B1 | 1/2004 | Sistanizadeh et al. | |
| 6,760,905 | B1 * | 7/2004 | Hostetter et al. | 717/148 |
| 6,950,825 | B2 | 9/2005 | Chang et al. | |
| 6,957,439 | B1 * | 10/2005 | Lewallen | 719/328 |
| 7,010,538 | B1 | 3/2006 | Black | |
| 7,080,077 | B2 | 7/2006 | Ramamurthy et al. | |
| 7,085,786 | B2 | 8/2006 | Carlson et al. | |
| 7,107,269 | B2 | 9/2006 | Arlein et al. | |
| 7,152,228 | B2 * | 12/2006 | Goodwin et al. | 717/146 |
| 7,155,705 | B1 * | 12/2006 | Hershberg et al. | 717/137 |
| 7,222,333 | B1 * | 5/2007 | Mor et al. | 717/115 |

(Continued)

OTHER PUBLICATIONS

Dourish, P., "Using Metalevel Techniques in a Flexible Toolkit for CSCW Applications", ACM Transactions On Computer-Human Interaction, vol. 5, No. 2, Jun. 1998, pp. 109-155.

(Continued)

*Primary Examiner* — Kuen Lu
*Assistant Examiner* — Tuan A Pham
(74) *Attorney, Agent, or Firm* — David W. Victor; Konrad Raynes & Victor LLP (57) ABSTRACT

Provided are a method, system, and article of manufacture for generating information on database queries in source code into object code compiled from the source code. Source code including query statements to perform operations with respect to a database is translated into executable object code. A statement descriptor for at least one query statement is generated into the object code, wherein the statement descriptor for the at least one query statement includes information on the query statement including the query statement in the source code. The statement descriptors in the object code are processed to output information on the query statements indicated in the statement descriptors.

39 Claims, 5 Drawing Sheets

U.S. PATENT DOCUMENTS

| | | | |
|---|---|---|---|
| 7,430,549 B2 * | 9/2008 | Zane et al. | 1/1 |
| 2001/0011371 A1 * | 8/2001 | Tang | 717/9 |
| 2002/0069261 A1 | 6/2002 | Bellare et al. | |
| 2002/0112044 A1 | 8/2002 | Hessmer et al. | |
| 2002/0188562 A1 | 12/2002 | Igarashi et al. | |
| 2003/0066056 A1 * | 4/2003 | Petersen et al. | 717/137 |
| 2003/0074355 A1 | 4/2003 | Menninger et al. | |
| 2003/0188187 A1 * | 10/2003 | Uchida | 713/200 |
| 2003/0208505 A1 * | 11/2003 | Mullins et al. | 707/102 |
| 2004/0024762 A1 | 2/2004 | Agarwal et al. | |
| 2004/0064453 A1 | 4/2004 | Ruiz et al. | |
| 2004/0194068 A1 * | 9/2004 | Warren et al. | 717/136 |
| 2005/0015356 A1 * | 1/2005 | Ireland et al. | 707/1 |
| 2005/0022029 A1 | 1/2005 | Potter et al. | |
| 2005/0028134 A1 * | 2/2005 | Zane et al. | 717/106 |
| 2005/0033779 A1 | 2/2005 | Seki et al. | |
| 2005/0060441 A1 | 3/2005 | Schmisseur | |
| 2005/0081107 A1 * | 4/2005 | DeWitt et al. | 714/38 |
| 2005/0086579 A1 * | 4/2005 | Leitner et al. | 715/500 |
| 2005/0091638 A1 * | 4/2005 | Bley | 717/111 |
| 2005/0108206 A1 * | 5/2005 | Lam et al. | 707/3 |
| 2005/0262086 A1 | 11/2005 | Ta et al. | |
| 2005/0262135 A1 * | 11/2005 | White | 707/103 R |
| 2006/0020933 A1 * | 1/2006 | Pasumansky et al. | 717/140 |
| 2006/0026042 A1 | 2/2006 | Awaraji et al. | |
| 2006/0085400 A1 | 4/2006 | Minore et al. | |
| 2006/0117014 A1 | 6/2006 | Qi | |
| 2006/0143594 A1 * | 6/2006 | Grimaldi | 717/123 |
| 2006/0149739 A1 | 7/2006 | Myers | |
| 2006/0155720 A1 | 7/2006 | Feinberg | |
| 2006/0206539 A1 | 9/2006 | Thompson | |
| 2006/0212559 A1 | 9/2006 | Turnbull et al. | |
| 2006/0248047 A1 | 11/2006 | Grier et al. | |
| 2007/0006188 A1 * | 1/2007 | Schroth et al. | 717/140 |
| 2007/0050343 A1 * | 3/2007 | Siddaramappa et al. | 707/3 |
| 2007/0055647 A1 * | 3/2007 | Mullins et al. | 707/2 |
| 2008/0120281 A1 * | 5/2008 | Marceau et al. | 707/3 |

OTHER PUBLICATIONS

Fraternali, P., "Tools and Approaches for Developing Data-Intensive Web Applications: A Survey", ACM Computing Surveys, vol. 31, No. 3, Sep. 1999, pp. 227-263.

Grimm, R., J. Davis, E. Lemar, A. MacBeth S. Swanson, T. Anderson, B. Bershad, G. Borriello, S. Gribble, and D. Wetherall, "System Support for Pervasive Applications", ACM Transactions on Computer Systems, vol. 22, No. 4, Nov. 2004, pp. 421-486.

Purdy, A., B. Schuchardt, and D. Maier, "Integrating an Object Server with Other Words", ACM Transactions on Office Information Systems, vol. 5, No. 1, Jan. 1987, pp. 27-47."Integrating an Object Server With Other Words", ACM Transactions on Office Information Systems, vol. 5, No. 1, Jan. 1987, pp. 27-47.

U.S. Appl. No. 11/549,196, filed Oct. 13, 2006, entitled "Apparatus, System, and Method for Database Management Extensions", invented by S.A. Brodsky, H. Karn, K.M. McBride, P. Wansch, and M. E. Weihrauch.

Paulson, L.D., "IBM Seeks to Unify Data-Access Approaches", Computer, vol. 36, Iss. 3, Mar. 2003, p. 22.

University of Manchester, "Appendix E: Programmatic SQL", [online], located on May 25, 2007, retrieved from the Internet at <URL: http://intranet.cs.man.ac.uk/study_subwab/Ugrad/coursenotes/CS2312/programming.pdf>, 38 pp.

Amendment 1, Mar. 31, 2009, for U.S. Appl. No. 11/549,196, Total 17 pp.

Amendment 2, Sep. 22, 2009, for U.S. Appl. No. 11/549,196, Total 17 pp.

Amendment 3, Apr. 28, 2010, for U.S. Appl. No. 11/549,196, Total 15 pp.

Amendment 4, Nov. 26, 2010, for U.S. Appl. No. 11/549,196, Total 15 pp.

Final Office Action 1, Jun. 22, 2009, for U.S. Appl. No. 11/549,196, Total 23 pp.

Office Action 1, Dec. 31, 2008, for U.S. Appl. No. 11/549,196, Total 25 pp.

Office Action 3, Dec. 28, 2009, for U.S. Appl. No. 11/549,196, Total 23 pp.

Office Action 4, Aug. 26, 2010, for U.S. Appl. No. 11/549,196, Total 24 pp.

Supplemental Amendment 5, Dec. 6, 2010, for U.S. Appl. No. 11/549,196, Total 16 pp.

Final Office Action 2, Feb. 18, 2011, for U.S. Appl. No. 11/549,196, Total 21 pp.

Office Action 6, Aug. 23, 2011, for U.S. Appl. No. 11/549,196, filed Oct. 13, 2006, by S.A. Brodsky et al., Total 30 pp. [57.152 (OA6)].

* cited by examiner

GENERATING INFORMATION ON DATABASE QUERIES IN SOURCE CODE INTO OBJECT CODE COMPILED FROM THE SOURCE CODE

BACKGROUND OF THE INVENTION

1. Field of the Invention

The present invention relates to a method, system, and article of manufacture for generating information on database queries in source code into object code compiled from the source code.

2. Description of the Related Art

Application programs written in a high-level computer language, such as C++, JAVA™, etc., may include a database query, such as a Structured Query Language (SQL) statement, to read, write, modify and delete data in an external source, such as a database. (Java is a trademark of Sun Microsystems, Inc. in the United States and other countries). The executable program may communicate queries to a database server over a network to execute against the target database. Application developers seek to improve the accuracy and response time in completing query processing, which is affected by the processing time at the application and database sides and the network communication time.

After writing the source code including the query statements, the developer invokes a compiler process to translate the source code and database query statements into executable object code. In an implementation where the SQL statements are dynamic, which means the query conditions or search parameters may be changed by the application when invoked, the query statements may be optimized and translated to binary code. In an implementation where the SQL statements are static, which means the query conditions or search parameters are not changed by the executing application in which they are called, a precompiler may output the query statements to a database request module. The query statements sent to the database request module are forwarded to a bind tool at the database that pre-processes the query statements, determines a query execution plan, and otherwise prepares the query for subsequent execution when the query is invoked by the application during runtime.

During debugging and testing, the application developer may review the original application source code to extract and analyze the query statements if there are problems during execution of the object code. For instance, the application developer may need to retrieve and manipulate information on the database query execution to test the database query performance in the application program. Further, end users may require certain quality of service with respect to application processing time, which may depend on the query processing time at the database server.

Developers may gather information about static database query requests, i.e., those that do not change during application execution, and catalog that information in a system catalog. However, such cataloged information is typically limited to information needed by the database to process the request and does not include a variety of information that would be helpful to trace the problem back to the application. Further, such catalog information may not be available for dynamic queries, i.e., those that may change during application execution. Developers may also employ an external program or product that intercepts or listens to queries that are sent to the database and to the resulting replies. While these programs provide a level of monitoring with minimal intrusion into the performance of the database or application, they can only observe information in the query request's command syntax made available by the database.

There is a need in the art for improved techniques for obtaining information on query statements in source code for testing the executable object code.

SUMMARY

Provided are a method, system, and article of manufacture for generating information on database queries in source code into object code compiled from the source code. Source code including query statements to perform operations with respect to a database is translated into executable object code. A statement descriptor for at least one query statement is generated into the object code, wherein the statement descriptor for the at least one query statement includes information on the query statement including the query statement in the source code. The statement descriptors in the object code are processed to output information on the query statements indicated in the statement descriptors.

In a further embodiment, a statement descriptor array is generated into the object code including one statement descriptor for each query statement in the source code.

In a further embodiment, a determination is made of database objects affected by the at least one query statement in the source code. Information on the determined database objects is generated into the at least one statement descriptor for the query statement affecting the determined database objects.

In a further embodiment, the query statements in the source code are modified to produce modified query statements that are optimized to improve performance of execution of the query statements. The query statements in the source code are included in the statement descriptors. The modified query statements are included in the statement descriptors. The modified query statements are translated into executable object code.

In a further embodiment, information on a name of an application comprising the source code is included in the statement descriptor. A determination is made of lines in the source code including the at least one query statement. For each statement descriptor, information on the determined lines in the source code including the query statement is included in the statement descriptor.

In a further embodiment, a determination is made of application code objects affected by the at least one query statement in the source code. Information is generated on the determined application code objects into the at least one statement descriptor for the query statement affecting the determined application code object.

In a further embodiment, the source code is processed to determine execution control commands in the source code that affect how the at least one query statement is executed. Information on the determined execution control commands in the source code that affect the query statement, whose information is included in the statement descriptor, is included in the at least one statement descriptor.

In a further embodiment, the object code for at least one query statement is executed to cause execution of the query at the database. Execution information on the execution of the at least one query statement at the database is gathered. Test information is gathered including the gathered execution information for the at least one query. The statement descriptor for the executed at least one query statement is accessed and information from the accessed at least one statement descriptor is included in the test information.

In a further embodiment, the execution information comprises at least one of performance information, warnings, errors, and alerts related to execution of the query statement.

In a further embodiment, a determination is made from the execution information as to whether a performance of the execution of the at least one query satisfies a quality of service criteria. The determination of whether the performance of the execution of the at least one query satisfies the quality of service criteria is generated into the test information.

In a further embodiment, information on the at least one query statement for which the at least one statement descriptor was generated is provided to a bind tool. The bind tool uses the information on the at least one query statement to optimize and preprocess the at least one query statement and prepare the at least one query statement for execution by a query engine of the database.

In a further embodiment, the source code defines at least one query statement as a method having a method name. A statement descriptor array is generated and each generated statement descriptor is included into the statement descriptor array. The method name for the query statement may be used to access the statement descriptor for the query statement in the statement descriptor array.

DETAILED DESCRIPTION

Figure 1:
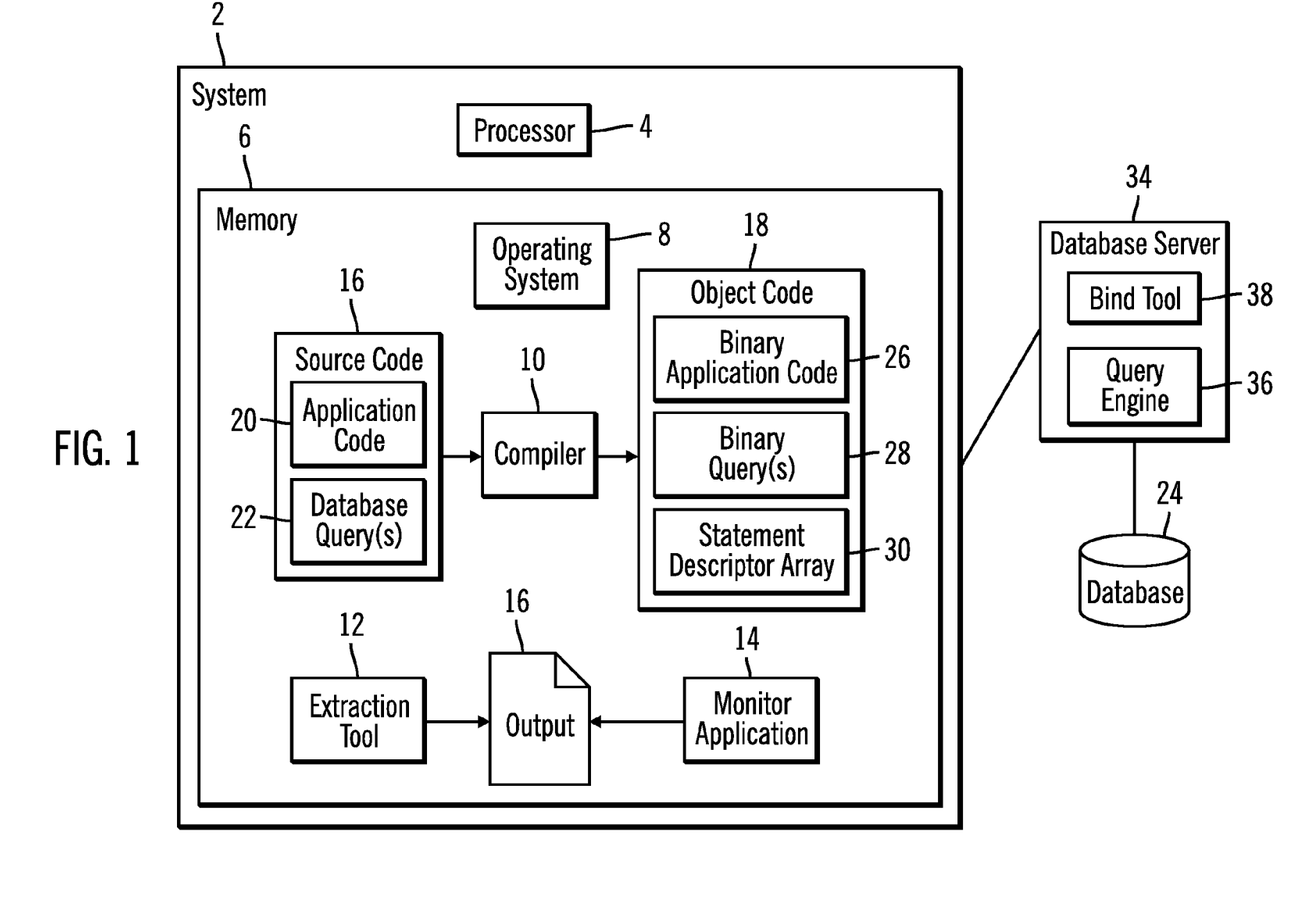
FIG. 1 illustrates an embodiment of a computing environment.

FIG. 1 illustrates an embodiment of a computing environment. A system 2 includes a processor 4 and memory 6 in which various programs are loaded for execution by the processor 4. The memory 6 includes programs such as an operating system 8, compiler 10, extraction tool 12, and monitor application 14. The operating system 8 implements a runtime environment in which programs run in the memory 6. The compiler 10 processes source code 16 to translate the source code 16 language statements into object code 18 that comprises computer executable machine instructions. A linker/loader (not shown) may further process the object code 18 to generate an executable file or library of files.

The source code 16 may include program statements in a high level computer programming language, such as C++, JAVA™, etc. (Java is a trademark of Sun Microsystems, Inc. in the United States and other countries). The source code 16 includes application code 20 to perform application related operations and database queries 22 in a database query language, such as the Structured Query Language (SQL), Open Database Connectivity (ODBC), Java Database Connectivity (JDBC), etc. The queries 22 are instructions to query data objects in a database 24 to perform operations with respect to data in a database as part of the application operations.

The object code 18 includes the computer executable code or binary code. Binary application code 26 and binary queries 28 comprise the computer executable instructions corresponding to the application code 20 and database queries 22, respectively, in the source code 16. The compiler 10 further generates a statement descriptor array 30 in the object code 18 having information on the database queries 22 translated to the binary queries 28 that may be used to obtain information on the queries when testing the object code 18. The extraction tool 12 and monitor application 14 may include methods and functions to access the information on the queries 22 in the statement descriptor array 30. The extraction tool 12 and monitor application 14 may be deployed in a production system to capture information about exceptional conditions that might occur. Alternatively, the extraction tool 12 and monitor application 14 may be deployed during the debugging and testing phase. In one embodiment, the statement descriptor array 30 provides information on the queries 22 inside the object code 18 file in a human readable text format. The extraction tool 12 and monitor application 14 may output information in the statement descriptor array 30 to output 32, which may comprise a file, such as a text file, extensible markup language (XML) file, etc., that may be presented to a user. Further, the extraction tool 12 and monitor application 14 may render information on queries from the statement descriptor array 30 to an output device, such as a display, printer or storage.

In FIG. 1, a database server 34 manages access to the database 24 that includes a query engine 36 to execute database queries against tables and objects in the database 24 and return data accessed according to the query. The database server 24 may further include a bind tool 38. The bind tool 38 receives information on query statements in the source code from the compiler 10 to pre-process the query statement, such as optimize the statement, generate a query execution plan, etc. to minimize the number of operations the query engine 36 must perform to execute the query in response to a call from the executing object code 18 to execute the database query.

In FIG. 1, the database server 34 and database 24 are shown as external to the system 2. In an alternative embodiment, the system 2 may include the database sever 34, query engine 36, bind tool 38, and database 24. In FIG. 1, the monitor application 14 is shown as executed in the same system 2 in which the compiler 10 translates the source code 16 to object code 18. In an alternative embodiment, the compiler 10 may be on one system and the monitor application 14 may be executed on a different system to test the object code 18.

The system 2 may comprise a computer system suitable for compiling code. The memory 6 may comprise a volatile memory device or devices in which programs are loaded for execution.

Figure 2:
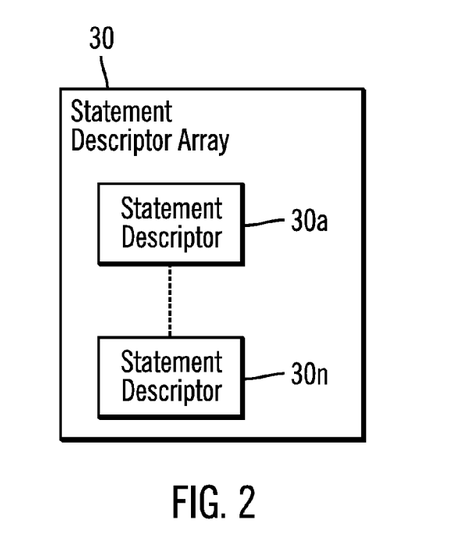
FIG. 2 illustrates an embodiment of a statement descriptor array.

FIG. 2 illustrates an embodiment of the statement descriptor array 30 as including a plurality of statement descriptors 30a . . . 30n generated by the compiler 10 for each translated database query 22 to provide information on the query 22. In one embodiment, the statement descriptors 30a . . . 30n may be indexed and referenced by a method name assigned to the queries 22 in the source code 16. For instance, the application developer may define a method name in the source code 16 as pointing to the database query 22. This method name may be used to locate or index the statement descriptor 30a . . . 30n for the query 22 in the statement descriptor array 30.

Figure 3:
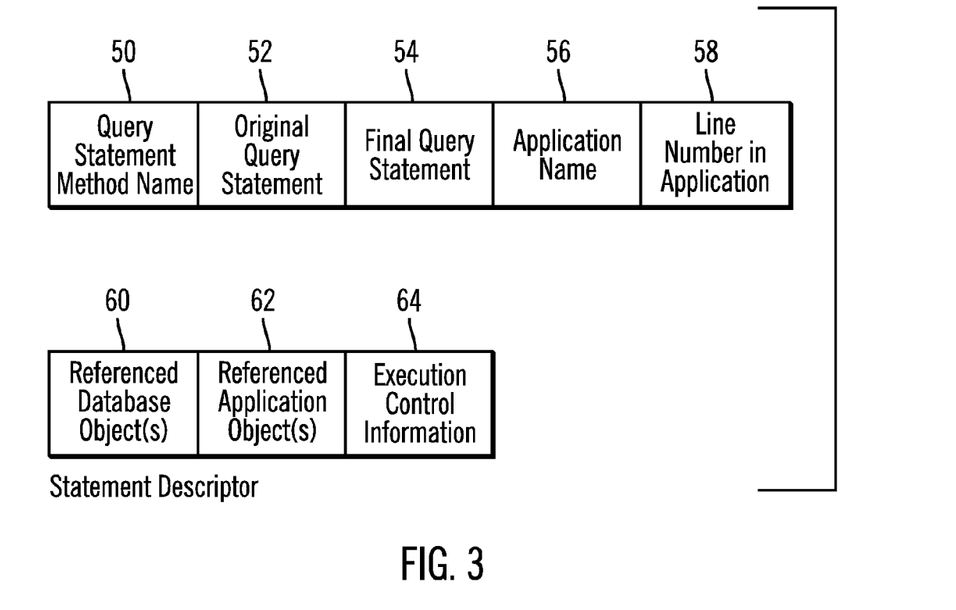
FIG. 3 illustrates an embodiment of information included in a statement descriptor.

FIG. 3 illustrates an embodiment of information the compiler 10 includes in a statement descriptor 30a . . . 30n for one query statement 22 in the source code 16, including: a query statement method name 50, original query statement 52, final query statement 54, application name 56, line number in the application 58, referenced database object(s) 60, referenced application object(s) 62, and execution control information 64.

The original query statement 52 is useful information on the initial query statement for a developer testing the code because the compiler 10 may perform extensive optimization and manipulation of the query statement 52 to produce the final query statement 54 based on heuristic knowledge of the target database 24, user-specified pattern templates (for example to override a table name used), user-specified execution controls (for example, for locking optimization), etc.

The final query statement 54 comprises the original query statement 52 including optimizations and modifications performed by the compiler 10. Application developers may want to compare and analyze the modified statement that is executed, i.e., final query statement 54, with the original query statement 52 included in the source code 16. Independent tools may also consider the final query statement 54 for independent verification of the quality of the final statement as produced by the compiler 10.

The application name 56 comprises the name of the source code 16 application. The line number in the application 58 comprises the line number in the source code 16 of the query statement 22 for which the statement descriptor 30a . . . 30n is generated.

The referenced database objects 60 comprise those database tables, columns, fields, objects, etc. that are accessed, i.e., read or updated, as a result of the query execution. This allows the application developer to determine the query's impact on the database 24.

The referenced application objects 62 comprise data structures and objects of the application 16 defined by the source code 16 that are affected by the query statement 22, such as objects updated with information accessed from the database 24 by the query 22.

Execution control information 64 comprises information on code controlling execution behavior that affects how the query 22 is executed. For example, execution control information may include locking behavior for the database 24 and "scrolling" behavior where the database returns a set of rows at a time and allows forward and backward traversal. This information is useful to understand execution and diagnose problems.

Figure 4:
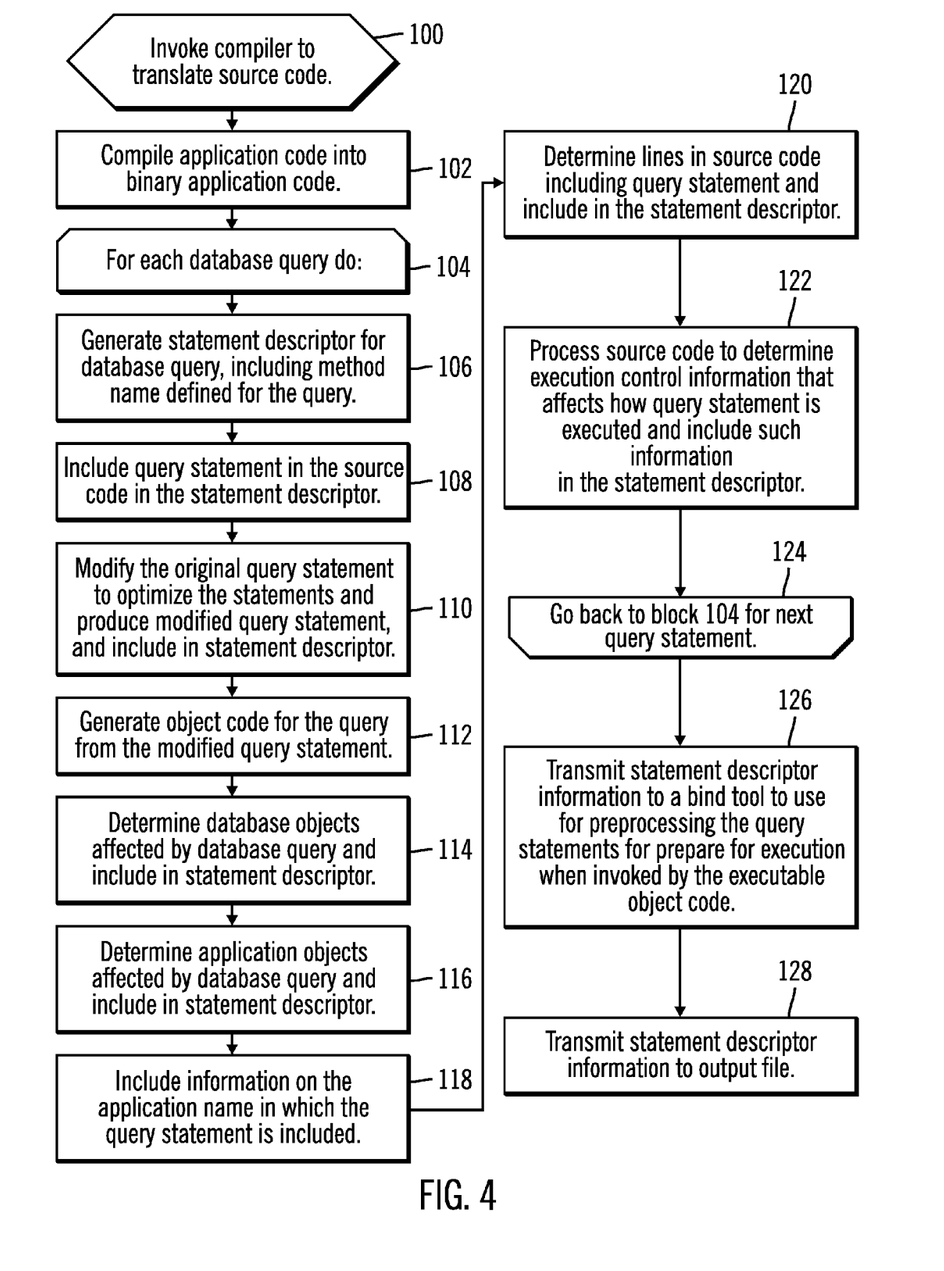
FIG. 4 illustrates an embodiment of operations to generate statement descriptors for query statements in source code.

FIG. 4 illustrates an embodiment of operations performed by the compiler 10 to generate the statement descriptor array 30 when translating the source code 16 into the object code 18. Upon invoking (at block 100) the compiler 10, the compiler 10 translates, e.g., assembles or compiles, (at block 102) the application code 20 into executable binary application code 26. For each database query statement 22, the compiler 10 performs the loop of operations at blocks 104 through 124. At block 106, the compiler 10 generates a statement descriptor 30a . . . 30n in the statement descriptor array 30 for the query statement 22 and includes the method name defined for the query statement 22 in the source code 16 in the query statement method name 50 field. The compiler 10 further includes (at block 108) the original query statement 22 in the source code in the field 52. The compiler 10 may modify (at block 110) the original query statement 22 to optimize the statement and produce a modified query statement, which may be included as final query statement 54 in the statement descriptor 30a . . . 30n, before being translated to binary query code 28. The compiler 10 generates (at block 112) the object code for the query 22 as binary query 28 by translating the modified query to include in the object code 18.

The compiler 10 may determine (at block 114) the database 24 objects affected by the database query to include as referenced database objects 60 in the statement descriptor 30a . . . 30n. The effected database 24 objects, e.g., columns, tables, etc., may be determined from the query statement which may specify columns (fields) and database tables to query. The compiler 10 may further determine (at block 116) application objects affected by the database query 22 and include those effected objects in the referenced application objects 62 field of the statement descriptor 30a . . . 30n. The compiler 10 may determine effected application objects by processing the source code 16 to determine how data accessed from the database 22 by the query is returned to data structures in the application defined by the source code 16.

The compiler 10 includes (at block 118) information on the application name in which the query statement 22 is included in the application name field 56. The compiler 10 determines (at block 120) lines in the source code 16 including the query statement 22, which may then be included in the line number field 58 of the statement descriptor 30a . . . 30n. The compiler 10 may further process (at block 122) the source code 16 to determine execution control information that affects how the query statement is executed and include such information in the execution control information 64 field in the statement descriptor 30a . . . 30n.

After generating the statement descriptors 30a . . . 30n for the query statements 22, the compiler 10 may transmit (at block 126) statement descriptor information to the bind tool 38 to use for pre-processing the query statements to prepare for execution when invoked by the executed object code 18. The compiler 10 may further transmit (at block 128) the statement descriptor 30a . . . 30n information to the output file 16. Further, the statement descriptor 30a . . . 30n may be provided to the bind tool 38 to use the compiled application and statement descriptor information as input to the bind process to pre-process the query for execution.

Figure 5:
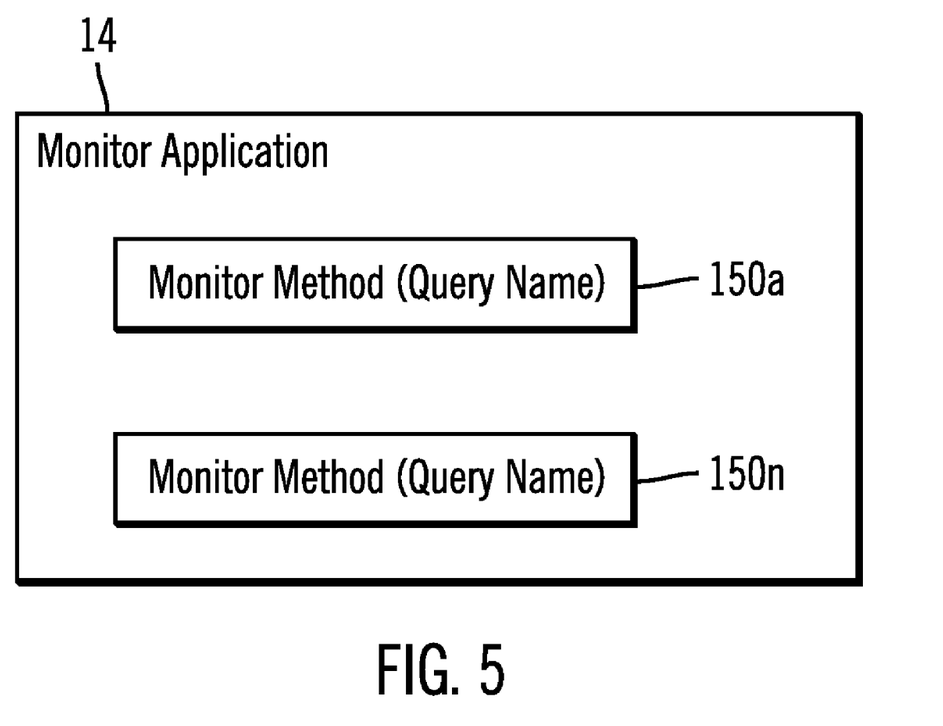
FIG. 5 illustrates an embodiment of a monitor application.

FIG. 5 illustrates an embodiment of the monitor application 14 as including one or more monitor methods 150a . . . 150n that have as a parameter the method name defined for a query 22 in the source code. The monitor methods 150a . . . 150n may comprise testing methods included as part of an application development package that may be used to utilize the statement descriptor information. Certain of the monitor methods may be used to access and output specific information of a statement descriptor 30a . . . 30n for one query, such as the information in fields 50, 52 . . . 64 (FIG. 3). Other methods may be used to invoke the binary queries 28 in the object code 18 to monitor and test the queries and their performance, including determining whether the query operations satisfy quality of service and performance requirements. The application developer may code the monitor application 14 to include various methods to test queries and other portions of the object code 18 during a debugging, testing, integration or production phase.

Figure 6:
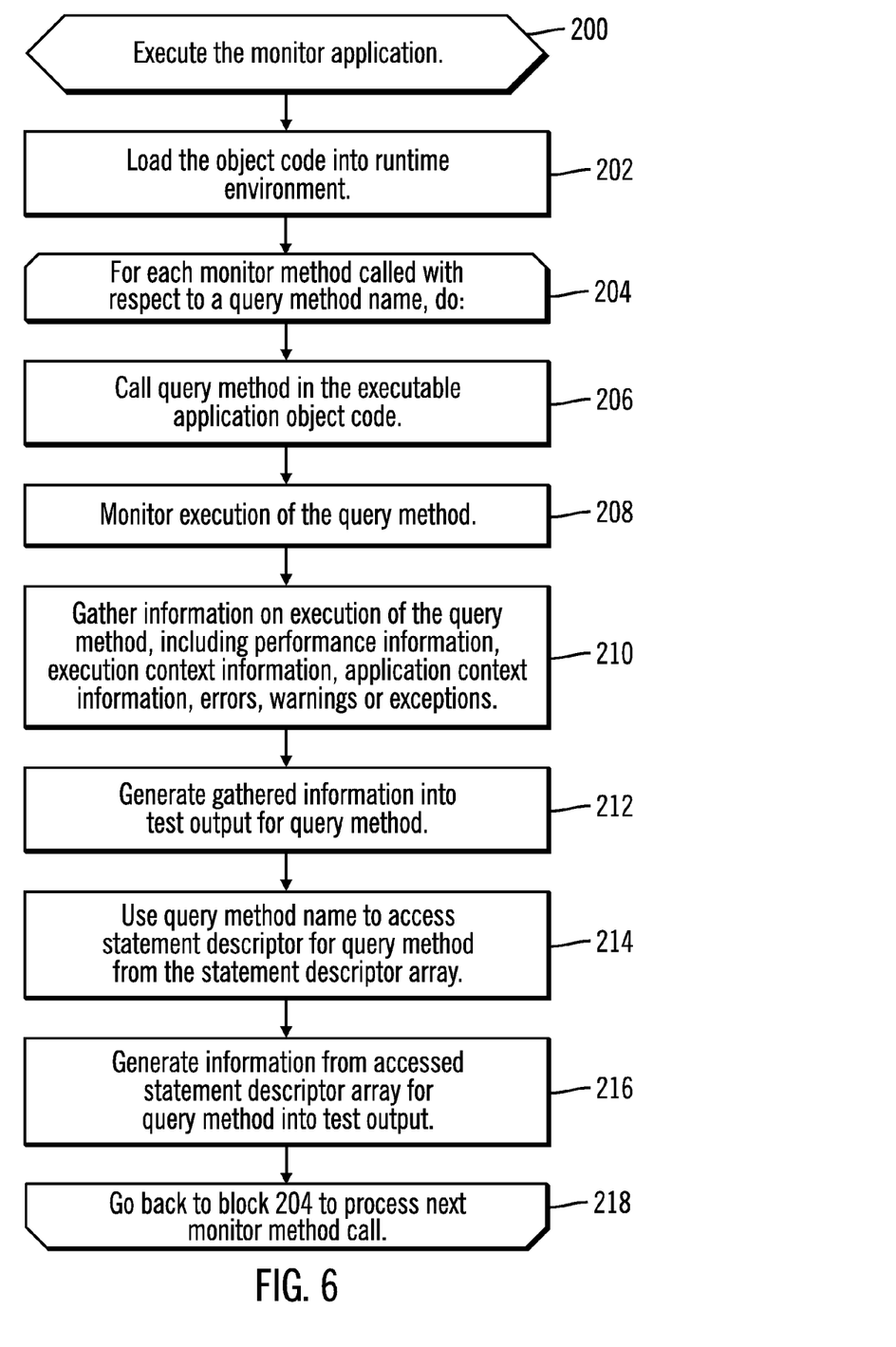
FIG. 6 illustrates an embodiment of operations to execute a monitor application to test query statements.

FIG. 6 illustrates an embodiment of operations performed by the monitor application 14 to test the queries by invoking the monitor methods 150a . . . 150n and other methods that are executed to perform the described operations. Upon executing (at block 200) the monitor application 14, the monitor application 14 loads (at block 202) the object code 18 into a runtime environment in the memory 6 provided by the operating system 8. The monitor application 14 performs a loop of operations at blocks 204 through 218 for each monitor method included in the monitor application 14. At block 206, the monitor application 14 calls the query method name in the executable object code 18 to invoke the query. The monitor application 14 monitors (at block 208) the execution of the query method, including the time for the database sever 34 to return query results, network address of the database server 24, etc.

The monitor application 14 gathers (at block 210) information on the execution of the query method, including performance information, execution context information, application context information, errors, warnings or exceptions. Performance information may comprise the total elapsed time for executing a query, as well as more granular detail on where that time was spent, e.g., how much time was spent traversing the network, how much time the database server 34 spent executing the query, and how much time a local database client and driver code spent executing the query. Execution context information may include information such as user identification (ID), thread identifier, network address, transaction name, which identifies the resources used to execute the query. Application context information comprises any applications or subroutines in which the query statement is nested.

The monitor application 14 may generate (at block 212) the gathered information for the monitored query method into test output 16. As part of generating the gathered information, the monitor application 14 may determine the extent to which the execution of the query satisfied certain performance or quality of service requirements and output information on the extent to which the specified performance and quality of service requirements and thresholds were satisfied or unfulfilled. The monitor application 14 may further use (at block 214) the query method name to access statement descriptor information 30*a* . . . 30*n* for the query method from the statement descriptor array 30 and include (at block 216) the accessed statement descriptor 30*a* . . . 30*n* information, e.g., information from any one of the fields 50, 52 . . . 64, into the test output.

Described embodiments provide techniques to include human readable information on database query statements in source code into the executable object code to use during code testing operations. Described embodiments further provide methods that may be used to perform testing operations and access information in the statement descriptor on the database queries subject to testing and provide such information to the application developer.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements or when used with different instances of the same element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4 and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   translating source code including at least one query statement written in a database query language into executable object code in a computer readable storage medium;
   generating a statement descriptor data structure in the object code including statement descriptor information for the translated at least one query statement including information on the at least one query statement as presented in the source code;
   executing the object code to cause execution of the at least one query statement;
   accessin~the statement descriptor information in the statement descriptor data structure in the object code for the at least one executed query statement; and
   processing the accessed statement descriptor information to output information on the at least one query statement included in the statement descriptor information.

2. The method of claim 1,
   wherein the statement descriptor data structure includes statement descriptor information for each query statement in the source code.

3. The method of claim 1, further comprising:
   determining database objects affected by the at least one query statement in the source code; and
   generating information on the determined database objects into the statement descriptor information for the at least one query statement affecting the determined database objects.

4. The method of claim 1, further comprising:
   modifying the at least one query statement in the source code to produce at least one modified query statement;
   including the at least one modified query statement in the statement descriptor information; and
   translating the at least one modified query statement into the executable object code.

5. The method of claim 4, wherein modifying the at least one query statement comprises optimizing the at least one query statement to improve performance of execution of the at least one query statement.

6. The method of claim 1, further comprising:
   including information on a name of an application comprising the source code into the statement descriptor information;
   determining lines in the source code including the at least one query statement; and
   generating information on the determined lines in the source code including the at least one query statement included in the statement descriptor information.

7. The method of claim 1, further comprising:
   determining application code objects affected by the at least one query statement in the source code; and
   generating information on the determined application code objects into the statement descriptor information for the at least one query statement affecting the determined application code objects.

8. The method of claim 1, further comprising:
   processing the source code to determine execution control commands in the source code that affect how the at least one query statement is executed; and
   including, in the statement descriptor information, information on the determined execution control commands in the source code that affect the at least one query statement whose information is included in the statement descriptor information.

9. The method of claim 1, further comprising:
   gathering execution information on the execution of the at least one query statement at the database;
   generating test information including the gathered execution information for the at least one query statement; and
   including information from the accessed statement descriptor information into the test information.

10. The method of claim 9, wherein the execution information comprises at least one of performance information, warnings, errors, and alerts related to execution of the query statement.

11. The method of claim 9, further comprising:
    determining from the execution information whether a performance of the execution of the at least one query statement satisfies a quality of service criteria; and
    generating into the test information the determination of whether the performance of the execution of the at least one query statement satisfies the quality of service criteria.

12. The method of claim 1, further comprising: providing information on the at least one query statement for which the statement descriptor information was generated to a bind tool, wherein the bind tool uses the provided information on the at least one query statement to optimize and preprocess the at least one query statement and prepare the at least one query statement for execution by a query engine of the database.

13. The method of claim 1, wherein the source code defines at least one query statement as a method having a method name, wherein the method name for the at least one query statement is used to access the statement descriptor information for the at least one query statement in the statement descriptor information.

14. A system in communication with a database, comprising:
    a computer readable storage medium;
    a compiler executed to perform operations, the operations comprising:
    translating source code including at least one query statement written in a database query language into executable object code in the computer readable storage medium; and
    generating a statement descriptor data structure in the object code
    including statement descriptor information for the translated at least one query statement including information on the at least one query statement as presented in the source code; and a monitor application executed to perform operations comprising—executing the object code to cause execution of the at least one query statement;

accessing the statement descriptor information in the statement descriptor data structure in the object code for the at least one executed query statement; and processing the accessed statement descriptor in to output information on the at least one query statement included in the statement descriptor information.

15. The system of claim 14, wherein the statement descriptor data structure includes statement descriptor information for each query statement in the source code.

16. The system of claim 14, wherein the operations further comprise:

determining database objects affected by the at least one query statement in the source code; and generating information on the determined database objects into the statement descriptor information for the at least one query statement affecting the determined database objects.

17. The system of claim 14, wherein the operations further comprise:

modifying the at least one query statement in the source code to produce at least one modified query statement;

including the at least one modified query statement in the statement descriptor information; and translating the at least one modified query statement into the executable object code.

18. The system of claim 17, wherein modifying the at least one query statement comprises optimizing the at least one query statement to improve performance of execution of the at least one query statement.

19. The system of claim 14, wherein the operations further comprise:

including information on a name of an application comprising the source code into the statement descriptor information;

determining lines in the source code including the at least one query statement; and generating information on the determined lines in the source code including the at least one query statement included in the statement descriptor information.

20. The system of claim 14, wherein the operations further comprise:

determining application code objects affected by the at least one query statement in the source code; and generating information on the determined application code objects into the statement descriptor information for the at least one query statement affecting the determined application code objects.

21. The system of claim 14, wherein the operations further comprise:

processing the source code to determine execution control commands in the source code that affect how the at least one query statement is executed; and including in the statement descriptor information, information on the determined execution control commands in the source code that affect the at least one query statement whose information is included in the statement descriptor information.

22. The system of claim 14, wherein the monitor application is further executed to perform:

gathering execution information on the execution of the at least one query statement at the database;

generating test information including the gathered execution information for the at least one query statement; and including information from the accessed statement descriptor information into the test information.

23. The system of claim 22, wherein the execution information comprises at least one of performance information, warnings, errors, and alerts related to execution of the query statement.

24. The system of claim 22, wherein the monitor application operations further comprise:

determining from the execution information whether a performance of the execution of the at least one query statement satisfies a quality of service criteria; and generating into the test information the determination of whether the performance of the execution of the at least one query statement satisfies the quality of service criteria.

25. The system of claim 14, wherein the operations further comprise:

providing information on the at least one query statement for which the statement descriptor information was generated to a bind tool, wherein the bind tool uses the provided information on the at least one query statement to optimize and preprocess the at least one query statement and prepare the at least one query statement for execution by a query engine of the database.

26. The system of claim 14, wherein the source code defines at least one query statement as a method having a method name, wherein the method name for the at least one query statement is used to access the statement descriptor information for the at least one query statement in the statement descriptor information.

27. An article of manufacture comprising a computer readable storage medium including code executed to cause operations, the operations comprising:

translating source code including at least one query statement written in a database query language into executable object code;

generating a statement descriptor data structure in the object code including statement descriptor information for the translated at least one query statement including information on the at least one query statement as presented in the source code;

executing the object code to cause execution of the at least one query statement;

accessing the statement descriptor information in the statement descriptor data structure in the object code for the at least one executed query statement; and processing the accessed statement descriptor information in the object code to output information on the at least one query statement included in the statement descriptor information.

28. The article of manufacture of claim 27, wherein the statement descriptor data structure includes statement descriptor information for each query statement in the source code.

29. The article of manufacture of claim 27, wherein the operations further comprise:

determining database objects affected by the at least one query statement in the source code; and generating information on the determined database objects into the statement descriptor information for the at least one query statement affecting the determined database objects.

30. The article of manufacture of claim 27, wherein the operations further comprise:

modifying the at least one query statement in the source code to produce at least one modified query statement;

including the at least one modified query statement in the statement descriptor information; and translating the at least one modified query statement into the executable object code.

31. The article of manufacture of claim 30, wherein modifying the at least one query statement comprises optimizing the at least one query statement to improve performance of execution of the at least one query statement.

32. The article of manufacture of claim 27, wherein the operations further comprise:
   including information on a name of an application comprising the source code into the statement descriptor information;
   determining lines in the source code including the at least one query statement; and
   generating information on the determined lines in the source code including the at least one query statement included in the statement descriptor information.

33. The article of manufacture of claim 27, wherein the operations further comprise:
   determining application code objects affected by the at least one query statement in the source code; and
   generating information on the determined application code objects into the statement descriptor information for the at least one query statement affecting the determined application code objects.

34. The article of manufacture of claim 27, wherein the operations further comprise:
   processing the source code to determine execution control commands in the source code that affect how the at least one query statement is executed; and
   including in statement descriptor information, information on the determined execution control commands in the source code that affect the at least one query statement whose information is included in the statement descriptor information.

35. The article of manufacture of claim 27, wherein the operations further comprise:
   gathering execution information on the execution of the at least one query statement at the database;
   generating test information including the gathered execution information for the at least one query statement; and
   including information from the accessed statement descriptor information into the test information.

36. The article of manufacture of claim 35, wherein the execution information comprises at least one of performance information, warnings, errors, and alerts related to execution of the query statement.

37. The article of manufacture of claim 35, wherein the operations further comprise:
   determining from the execution information whether a performance of the execution of the at least one query statement satisfies a quality of service criteria; and
   generating into the test information the determination of whether the performance of the execution of the at least one query statement satisfies the quality of service criteria.

38. The article of manufacture of claim 27, wherein the operations further comprise:
   providing information on the at least one query statement for which the statement descriptor information was generated to a bind tool, wherein the bind tool uses the provided information on the at least one query statement to optimize and preprocess the at least one query statement and prepare the at least one query statement for execution by a query engine of the database.

39. The article of manufacture of claim 27, wherein the source code defines at least one query statement as a method having a method name, wherein the method name for the at least one query statement is used to access the statement descriptor information for the at least one query statement in the statement descriptor information.

* * * * *